(12) United States Patent
Yamamoto

(10) Patent No.: US 7,072,253 B2
(45) Date of Patent: Jul. 4, 2006

(54) OPTICAL DISC REPRODUCTION APPARATUS AND AUTOMATIC ADJUSTMENT METHOD FOR SAME

(75) Inventor: Hiromichi Yamamoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 351 days.

(21) Appl. No.: 10/430,700

(22) Filed: May 6, 2003

(65) Prior Publication Data

US 2003/0227839 A1   Dec. 11, 2003

(30) Foreign Application Priority Data

May 8, 2002   (JP) ............................. 2002-132977

(51) Int. Cl.
*G11B 7/00* (2006.01)

(52) U.S. Cl. .................. 369/44.29; 369/53.29
(58) Field of Classification Search .............. 369/44.29
See application file for complete search history.

(56) References Cited

U.S. PATENT DOCUMENTS

| | | | |
|---|---|---|---|
| 5,610,886 A | | 3/1997 | Hayashi et al. |
| 5,703,841 A | * | 12/1997 | Hiroki ...................... 369/13.24 |
| 5,825,580 A | * | 10/1998 | Shibata .................... 360/77.08 |
| 6,034,937 A | | 3/2000 | Kumagai |
| 6,519,213 B1 | * | 2/2003 | Song et al. ............... 369/44.26 |
| 6,577,472 B1 | * | 6/2003 | Yamamoto et al. .......... 360/135 |
| 6,885,629 B1 | * | 4/2005 | Oshima et al. ........... 369/275.3 |
| 6,904,232 B1 | * | 6/2005 | Ayat et al. .................. 386/125 |
| 2002/0003757 A1 | * | 1/2002 | Uhde et al. .............. 369/44.29 |
| 2003/0016603 A1 | * | 1/2003 | Tomita ...................... 369/47.3 |

* cited by examiner

*Primary Examiner*—William Korzuch
*Assistant Examiner*—Adam R. Giesy
(74) *Attorney, Agent, or Firm*—Brinks Hofer Gilson & Lione

(57) ABSTRACT

An optical disc reproduction apparatus is provided for permitting appropriate automatic adjustment to a servo control system, particularly a CD and a DVD-ROM having a BCA.

A limit switch 24 is disposed in such a manner that it detects movement of an optical pickup 11 to a position which is located at a radius of 23.49 mm from the center. A system controller 22 moves the optical pickup 11 by 1.0 mm in an outer radial direction from the position detected by the limit switch 24, and reads a signal from an optical disc 5 at that position to carry out the automatic adjustment to the servo system, through a servo controller 21 and a feed motor 18. As a result, in the CD, a signal within a lead-in area thereof is used for and subjected to the automatic adjustment performed by the servo controller 21, while in the DVD-ROM, a signal in an outer peripheral area of a lead-in area having the BCA and in the vicinity thereof is used for and subjected to the adjustment.

17 Claims, 4 Drawing Sheets

OPTICAL DISC REPRODUCTION APPARATUS AND AUTOMATIC ADJUSTMENT METHOD FOR SAME

BACKGROUND OF THE INVENTION

1. Field of the Invention

The present invention relates to an optical disc reproduction apparatus for optically reading a signal from an optical disc serving as a recording medium to reproduce data and, more particularly, to a technique of automatic adjustment of a servo system performed before reproduction of data in an optical disc reproduction apparatus

2. Description of the Prior Art

It is well known to use an optical disc as a recording medium from which signals can be optically read, for example, a CD (Compact Disc) (including a CD-DA (Compact Disc Digital Audio), a CD-ROM (Compact Disc Read Only Memory), a CD-R (Compact Disc Recordable), a CD-RW (Compact Disc Rewritable)), a DVD-ROM (Digital Video Disc Read Only Memory), a DVD-RW(Digital Video Disc Rewritable), and the like.

Conventionally, in optical reproduction apparatuses for reproducing data from such optical discs, automatic adjustment to the servo systems is carried out before the reproduction of data as follows. That is, once an optical disc is loaded on an optical reproduction apparatus, an optical pickup for reading a signal from the optical disc is first moved in an inner radial direction of the optical disc. The position of the pickup in the radial direction is identified by a limit switch which is adapted to be turned on when the pickup reaches a predetermined position at an inner periphery. Thus, the pickup is located on a lead-in area formed at the inner peripheral side of the optical disc. Signals are then read from the lead-in area by means of the pickup irradiating the optical disc with laser light. Simultaneously, in order to bring the pickup to a state in which signals are accurately read out with stability, there are provided automatic adjustments to characteristics including an offset, a phase and a loop gain value in various servo control such as focus servo control of the pickup, servo control of rotation of the optical disc, tracking servo control thereof, and the like. After such initial adjustments, reproduction of data from the optical disc is started.

In some lead-in areas of DVD-ROM discs, there is an area called Burst Cutting Area (BCA) with signals radially recorded thereon, which area has a lower refractive index than that of other areas having signals recorded in the form of normal pits. In this case, appropriate automatic adjustment is not available in the BCA part of the lead-in area within the DVD-ROM. In addition, parts other than the BCA part in the lead-in area of the DVD-ROM are limited or restricted in a radial direction due to the existence of the BCA. This makes it difficult to accurately position the optical pickup within parts other than the BCA in the lead-in area when using the conventional automatic adjustment technique.

Provided that both CDs and DVD-ROMs are capable of being reproduced in a single optical disc reproduction apparatus, the following problem will arise. That is, the lead-in area of the CD and the lead-in area of the DVD-ROM partially overlap in a radial direction. It has been suggested to read out signals and perform automatic adjustment by disposing the optical pickup within a range where the CD lead-in area overlaps the DVD-ROM lead-in area. The aforesaid BCA range of the DVD-ROM, however, also partially overlaps the lead-in area of the CD in the radial direction. Accordingly, when carrying out the described automatic adjustment simply by positioning the pickup within the range of the CD lead-in area that overlaps the DVD-ROM lead-in area and reading signals therefrom, there is a possibility that signals are read from the BCA, resulting in inappropriate adjustment.

It should be noted that there is provided an area called Narrow Burst Cutting Area (NBCA) within a lead-in area in some DVD-RW discs with signals radially recorded thereon and which has a lower refractive index. Also, there is a possibility that this NBCA is located within a range of the DVD-RW lead-in area that overlaps the lead-in area of the CD or the DVD-ROM in the radial direction. Therefore, even in the DVD-RW, the above-mentioned problem will arise as in the case with the DVD-ROM.

SUMMARY OF THE INVENTION

It is an object of the present invention to provide appropriate automatic adjustment of a servo control system in an optical disc reproduction apparatus for reproducing data from an optical disc such as a DVD-ROM disc having a BCA or a DVD-RW disc having a NBCA.

Further, it is another object of the present invention to provide appropriate automatic adjustment of a servo control system in an optical disc reproduction apparatus for reproducing data from a plurality of optical discs including a DVD-ROM having a BCA or a DVD-RW having a NBCA.

To achieve the above-mentioned objects, according to the present invention, there is provided an optical disc reproduction apparatus for rotating an optical disc and reading a signal recorded in the optical disc by an optical pickup to reproduce data, while carrying out servo control including at least one of focus servo control and tracking servo control, which apparatus comprises an automatic adjustment section for adjusting a characteristic of the servo control before the reproduction of the data. This automatic adjustment section comprises an optical pickup arrangement controller for moving the optical pickup to an automatic adjustment position of interest which is located away from the rotation center of the optical disc by a predetermined distance in the radial direction, and an adjustment section for adjusting the characteristic of the servo control in accordance with the signal read from the optical disc by the optical pickup at the automatic adjustment position of interest. This predetermined distance is more than 23.55 mm.

The optical disc may be one of a DVD-ROM and a DVD-RW. In this case, the BCA or NBCA formed in the optical disc has a radial limit up to 23.5 (±0.05) mm from the center of the optical disc. Accordingly, the optical disc reproduction apparatus with the above-mentioned construction permits automatic adjustment of the servo control system, targeting an area which has no BCA or NBCA formed therein and on which signals are recorded in the form of normal pits.

According to the present invention, in a case where the optical disc reproduction apparatus is to load a set of the CD and the DVD-ROM, or a set of the CD and the DVD-RW, or a set of the CD, the DVD-ROM and the DVD-RW, as the optical discs and to reproduce the data therefrom, the above-mentioned predetermined distance in the described optical disc reproduction apparatus may be more than 23.55 mm and less than 24.8 mm. Since the lead-in area of the CD ranges from 23 mm to 25 (−0.2) mm in the radial direction with respect to the center of the optical disc, the above construction enables automatic adjustment of the servo control system for the lead-in area that is certain to record signals when reproducing the CD as the optical disc.

Further, in this case, the predetermined distance is preferably more than 23.55 mm and less than 23.8 mm. Because the lead-in area of the DVD-ROM or the DVD-RW has a radius that is up to 24 (−0.2) mm in the radial direction, automatic adjustment of the servo control system can be targeted for the lead-in area (which is located outside the BCA or the NBCA) even when reproducing a DVD-ROM or a DVD-RW, as is the case with reproduction of the CD as the optical disc.

It should be noted that when the optical disc reproduction apparatus is used to load a set of the CD and the DVD-ROM, or a set of the CD and the DVD-RW, or a set of the CD, the DVD-ROM, and the DVD-RW, as optical discs and to reproduce the data therefrom, the predetermined distance may be set more than 24.0 mm and less than 24.8 mm. In reproduction of the DVD-ROM or the DVD-RW, this disables automatic adjustment of the servo control system targeting the lead-in area thereof. In this case, however, automatic adjustment will be made at an area located in a vicinity beyond the outer periphery of the lead-in area of the DVD-ROM or the DVD-RW, that is, an area where signals are certain to be recorded. Accordingly, the appropriate automatic adjustment will be provided. Also, this has an advantage in permitting wide tolerance on the arrangement of the optical pickup upon starting the automatic adjustment even in the reproduction of the above DVD-ROM or the DVD-RW, compared with the case of the automatic adjustment to the servo control system for the lead-in area thereof.

The optical pickup arrangement controller in the above-mentioned optical disc reproduction apparatus may comprise a limit switch for detecting movement of the pickup to a predetermined detection position, and a movement controlling section for moving the optical pickup to the automatic adjustment position of interest. This movement controlling section may be operable to move the optical pickup in the radial direction of the optical disc, to cause the limit switch to detect the movement of the optical pickup to the detection position, and then to move the optical pickup to the automatic adjustment position based on the position where the optical pickup is located when the limit switch detects the movement of the optical pickup. The predetermined detection position may be located away from the rotation center of the optical disc by a distance less than 23.8 mm.

This can cause the optical pickup to be located appropriately at the predetermined automatic adjustment position of interest. Simultaneously, this also permits reading of recorded signals from a part located in the outer periphery of the lead-in area within the DVD-ROM or the DVD-RW by means of the optical pickup without a problem, even when the optical pickup is prohibited from moving to an inner peripheral area from the predetermined detection position, which is to be detected by the limit switch, so as to protect the optical pickup itself.

The predetermined detection position may be located away from the rotation center of the optical disc by a distance less than 23.45 mm. In this case, this also permits reading of recorded signals from the entire area beyond the BCA or the NBCA and within the lead-in area of the DVD-ROM or the DVD-RW by means of the optical pickup without a problem, even when the optical pickup is prohibiting from moving to an inner peripheral area from the predetermined detection position, which is detected by the limit switch.

DETAILED DESCRIPTION OF THE PREFERRED EMBODIMENTS

Hereinafter various preferred embodiments of the present invention will be described in detail with reference to the accompanying drawings.

Figure 1:
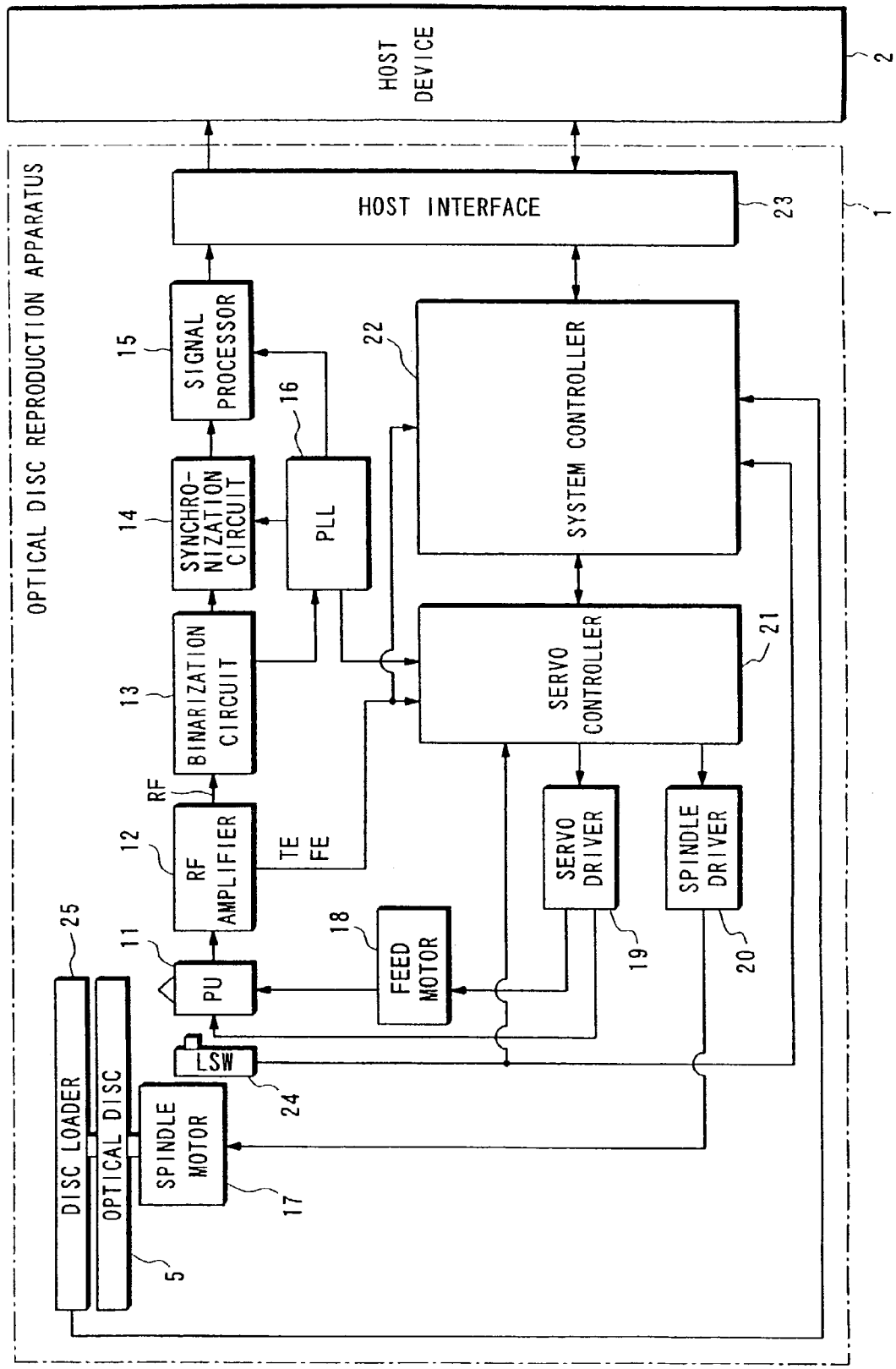
FIG. 1 is a block diagram showing a configuration of an optical disc reproduction apparatus according to a preferred embodiment of the present invention.

FIG. 1 shows a configuration of an optical disc reproduction apparatus according to one preferred embodiment of the present invention.

Referring now to the figure, an optical disc reproduction apparatus 1 is connected to a host device 2 that utilizes data reproduced by the optical disc reproduction apparatus 1 itself. The optical disc reproduction apparatus 1 includes an optical pickup 11, a RF amplifier 12, a binarization circuit 13, a synchronization circuit 14, a signal processor 15, a PLL circuit 16, a spindle motor 17, a feed motor 18, a servo driver 19, a spindle motor driver 20, a servo controller 21, a system controller 22, a host interface 23, a limit switch 24, and a disc loader 25.

The optical pickup 11 is used to read recorded signals from an optical disc 5 and comprises a laser light source, an object lens for gathering irradiated light from the laser light source and guiding light reflected from a signal-recording surface of the disc to an optoelectronic device, a focus actuator for adjusting a focus position by moving the object lens in a direction orthogonal to the signal-recording surface of the optical disc 5, and a tracking actuator for performing tracking adjustment by moving the object lens in the radial direction of the optical disc 5.

The RF amplifier 12 is operable to generate and produce as an output a RF signal by amplifying a signal received from the optical pickup 11 and performing predetermined equalizer or equalizing processing. Also, the RF amplifier 12 generates a focus error (FE) signal needed for focus servo control and a tracking error (TE) signal needed for tracking servo control. The feed motor 18 performs a seek operation to move the optical pickup 11 in the radial direction of the optical disc 5. The servo driver 19 drives not only the feed motor 18 but also the focus actuator installed in the optical pickup 11. The spindle motor 17 rotates the disc 5 at a predetermined rotational speed. The spindle motor driver 20 drives the spindle motor 17.

The servo controller 21 performs various servo control using the tracking error (TE) signal and the focus error (FE) signal. For example, the servo controller 21 performs control of the laser light source, the focus servo control, and the tracking servo control, by sending commands to the servo driver 19, while performing servo control of the number of revolutions of the spindle motor 17 by sending a command to the spindle motor driver 20.

The binarization circuit 13 carries out binarization of a level of the RF signal received from the RF amplifier 12 in comparison with a predetermined voltage level. The synchronization circuit 14 performs sampling of a signal received from the binarization circuit 13 utilizing an inner clock signal CLK to generate sampling data. The signal processor 15 subjects predetermined processing such as EFM demodulation processing or the like to the sampling data received from the synchronization circuit 14 and reproduces the data recorded in the optical disc 5 to transmit it to the host interface 23.

The PLL circuit 16, based on the signal received from the binarization circuit 13, generates the inner clock signal CLK which is in phase with the signal from the circuit 13, to supply the generated CLK signal to the synchronization circuit 14, the signal processor 15, the servo controller 21, and the like.

The system controller 22 controls the above-mentioned components according to lead commands received from the host device 2 through the host interface 23. Then, the controller reproduces the data from the optical disc 5 to transmit it to the host device 2 through the host interface 23.

The disc loader 25 is a loading mechanism for loading the optical disc 5 on a spindle of the spindle motor 17. If it loads the optical disc 5, the disc loader informs the system controller 22 of the loading. The limit switch 24 is a switch for detecting movement of the optical pickup 11 to a predetermined position toward the inner peripheral side of the optical disc. When it detects the movement, the limit switch informs the servo controller 21 and the system controller 22 of that movement.

Figure 2:
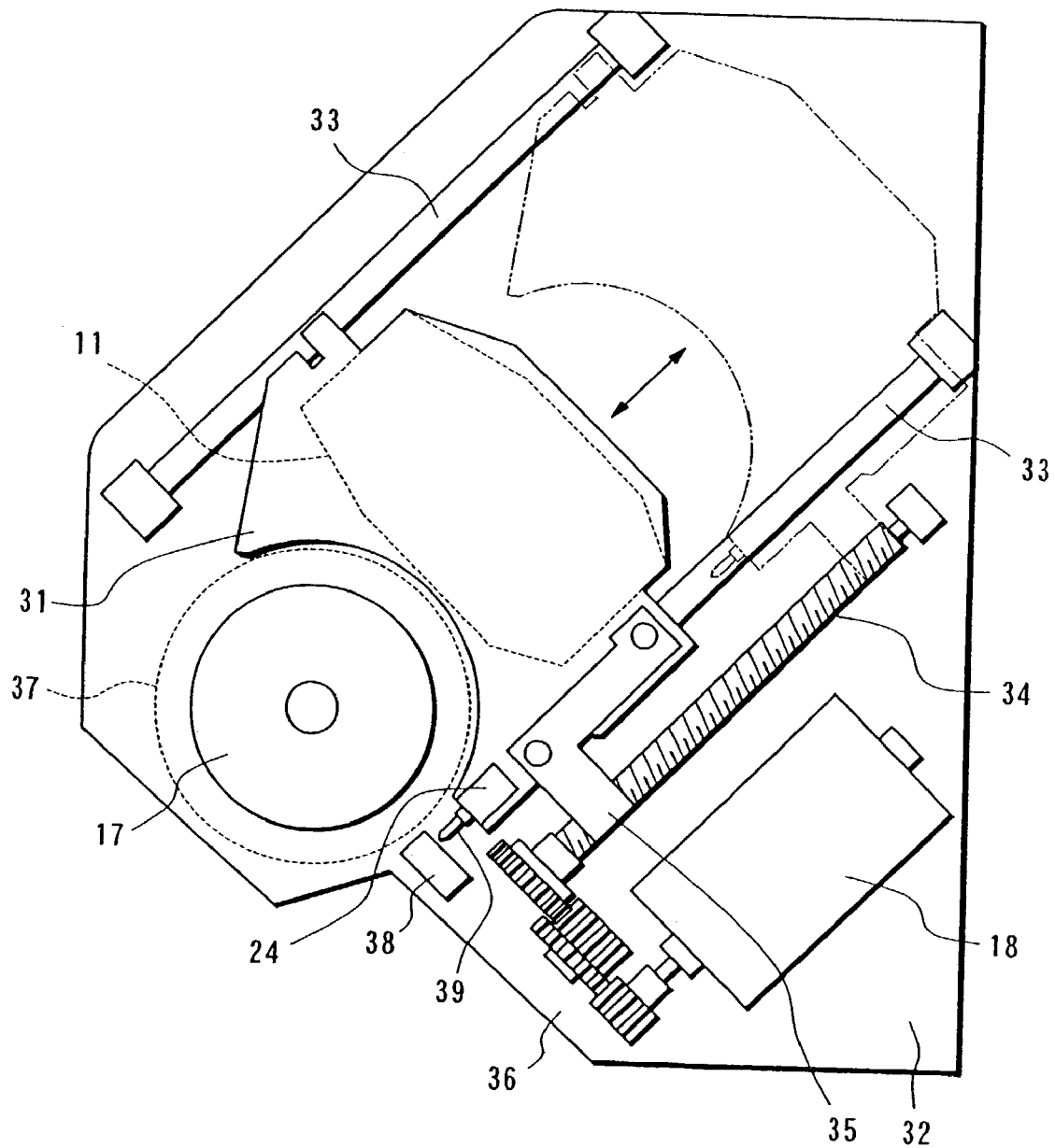
FIG. 2 is a diagram showing a moving mechanism for moving an optical pickup in a radial direction installed in the optical disc reproduction apparatus according to the preferred embodiment.

FIG. 2 shows an exemplary configuration of such a limit switch 24. A moving mechanism for moving the optical pickup 11 in the radial direction is illustrated, as well as the optical pickup 11, the spindle motor 17, the feed motor 18 and the limit switch 24 of FIG. 1. Referring now to the figure, the optical disc reproduction apparatus 1 includes a pickup chassis 31, a drive chassis 32, two guide shafts 33, a screw shaft 34, a spring nut 35, a gear train 36, and a turntable 37.

In this construction, if the feed motor 18 rotates normally after the optical disc 5 (not shown in FIG. 2) is loaded on the turntable 37, a driving force is transferred to the screw shaft 34 through the gear train 36, so that the optical pickup 11 is moved in an inner radial direction along the radial direction of the disc through the spring nut 35 that engages transferring grooves of the screw shaft 34. Thereafter, an operating portion 39 of the limit switch 24, which is attached to an edge of the pickup chassis 31 supporting the optical pickup 11, is brought into abutment against a wall 38 standing on the drive chassis 32 and depressed, so that the limit switch 24 is switched from an off state to an on state. It should be noted that if the feed motor 18 rotates reversely, then the optical pickup 11 is moved in an outer radial direction along the radial direction of the disc, causing the limit switch 24 to return to the off state.

Also, note that the above-mentioned configuration of the limit switch 24 is only one example. The limit switch 24 may have other configurations including a configuration in which the switch optically or electromagnetically detects the movement of the optical pickup 11 to the predetermined position located on the inner peripheral side of the optical disc.

Now, an automatic adjustment operation performed by this optical disc reproduction apparatus 1 will be described in detail.

Figure 3:
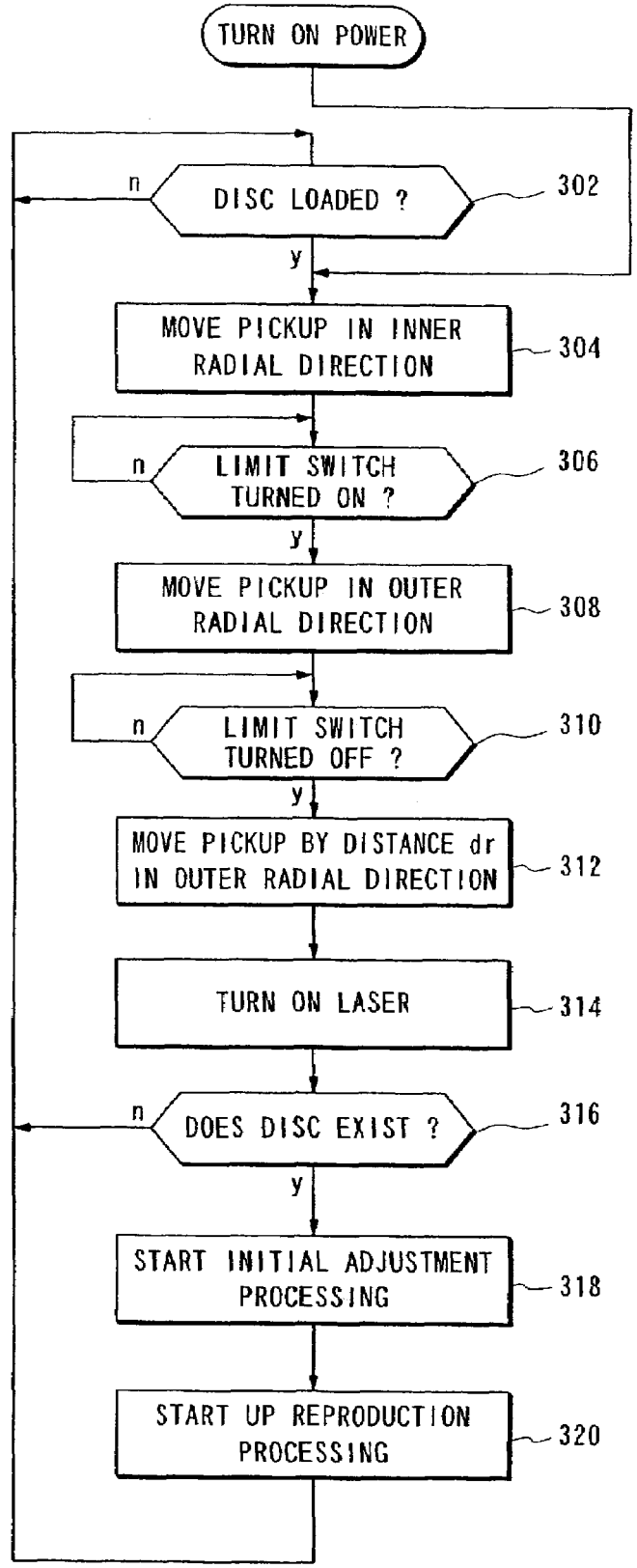
FIG. 3 is a flowchart showing processes for carrying out automatic adjustment processing in the optical disc reproduction apparatus according to the preferred embodiment.

FIG. 3 shows the steps of the operation performed by the system controller 22 in the automatic adjustment. Referring to the figure, if power is turned on, or if loading of the optical disc 5 is performed by the disc loader 25 (step 302), the system controller 22 controls the feed motor 18 through the servo controller 21 and the servo driver 19 and moves the optical pickup 11 in the inner radial direction (step 304).

The limit switch 24 operates in accordance with the optical pickup 11 moving in the inner radial direction. When the optical pickup 11 reaches a predetermined position in the radial direction, the limit switch 24 is turned on to inform the servo controller 21 and the system controller 22 of the current state, as mentioned above. When the servo controller 21 is informed that the limit switch 24 is turned on, it stops the movement of the optical pickup 11.

Further, the system controller 22, when it is informed that the limit switch 24 is turned on (step 306), controls the feed motor 18 through the servo controller 21 and the servo driver 19 to move the optical pickup 11 in the outer radial direction (step 308). Thereafter, when the limit switch 24 is switched to off (step 310), the controller 22 further moves the optical pickup 11 by a distance dr in the outer radial direction (step 312).

Then, rotation of the spindle motor 17 is started through the servo controller 21 and the spindle driver, causing a laser of the optical pickup 11 to be turned on through the servo controller 21 and the servo driver 19 (step 314). Thus, it is determined whether the optical disc 5 exists or not in a reproduction position, based on the existence of reflected light which is indicated by the focus error (FE) signal supplied from the RF amplifier 12 (step 316). In a case where the optical disc 5 does not exist, the rotation of the spindle motor 17 is stopped, and the laser of the optical pickup 11 is turned off, thus terminating the processing.

In contrast, when the optical disc 5 exists, automatic adjustment is carried out (step 318). If the automatic adjustment is ended, then normal data reproduction processing is started (step 320), leading to the data reproduction processing.

In the above-mentioned automatic adjustment, external perturbations are intentionally given to various servo systems in the servo controller 21, whereby the focus error (FE) signal and the tracking error signal received from the RF amplifier 12 are checked. Accordingly, adjustment processing to the servo control, such as focus servo control of the pickup, servo control of the rotation of the optical disc 5, and the tracking servo control thereof, is carried out by use of a method for determining appropriate values of an offset, a phase and a loop gain of the described servo control.

Now, a detailed description of the area of the optical disc 5 subjected to the automatic adjustment in the above-mentioned processing will be given below.

Figure 4:
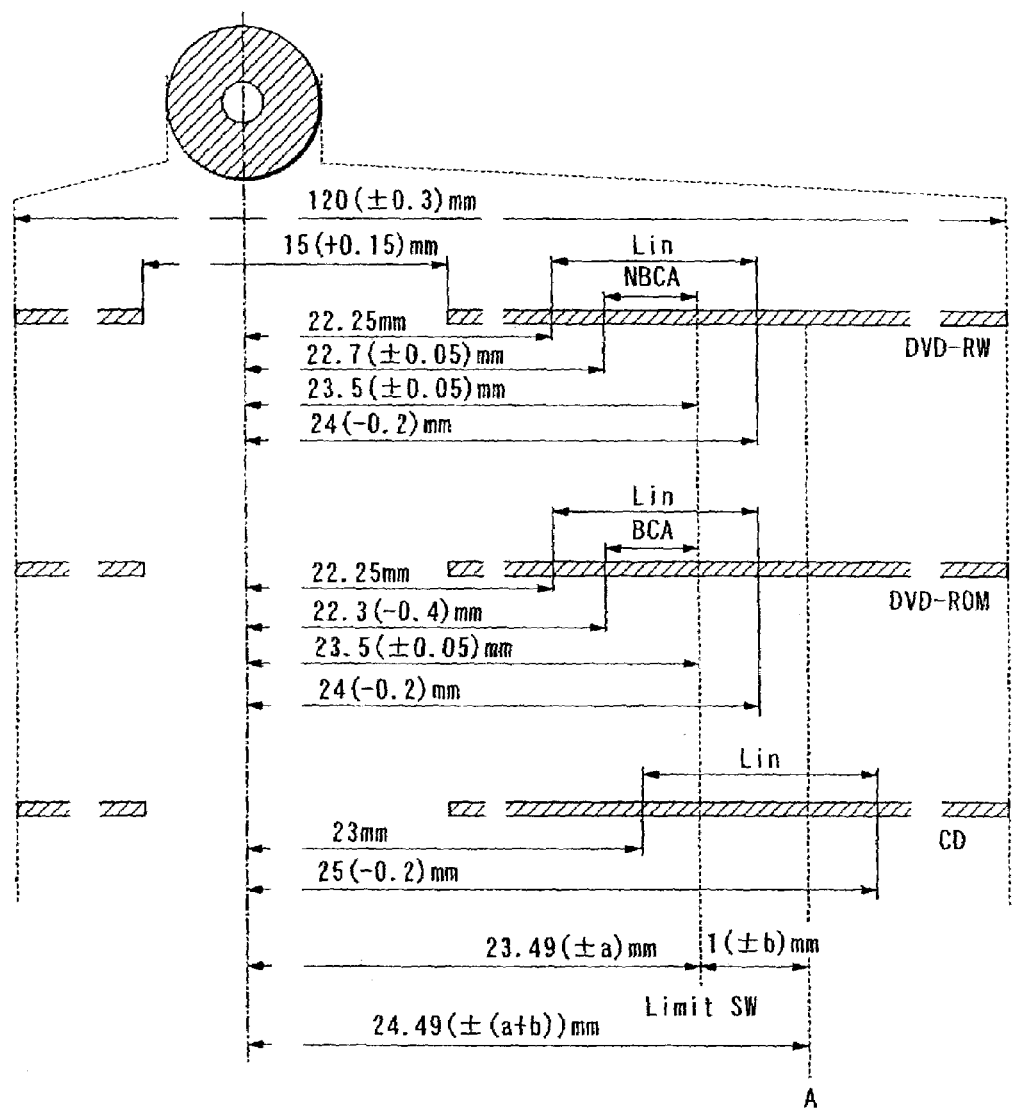
FIG. 4 is a diagram showing positions on the optical disc to be subjected to the automatic adjustment in the optical disc reproduction apparatus according to the preferred embodiment.

FIG. 4 shows relationships among the lead-in areas of a CD, a DVD-ROM and a DVD-RW, ranges in the radial direction of the BCA of a DVD-ROM and of the NBCA of a DVD-RW, a position of the optical pickup 11 in the radial direction where the limit switch 24 is switched from on to off, and a position in the radial direction which is subjected to the automatic adjustment.

Referring now to the figure, the lead-in area $L_{in}$ within the CD has a radius ranging from 23 mm to 25 (−0.2) mm in the radial direction (note that the term inside parentheses is the tolerance measured in mm). In cases where the BCA exists, the lead-in area within the DVD-ROM or the DVD-RW has a radius ranging from 22.25 mm to 24 (−0.2) mm in the radial direction. In some DVD-ROM discs, a BCA having a radius of 22.3 (−0.4) mm to 23.5 (±0.05) mm may exist as shown in the figure, while in some DVD-RW discs, an NBCA having a radius of 22.7 (±0.05) mm to 23.5 (±0.05) mm may exist as shown in the figure.

In the embodiment, the optical pickup 11 located at a position away from the rotation center of the optical disc by a distance less than 23.49 mm with the limit switch 24 on, is moved from that position to a position located away from the rotation center thereof by 23.49 mm in the radial direction. At this time, the limit switch 24 is switched from on to off. Thus, the limit switch 24 is disposed such that it achieves the above-mentioned operation. After the change of the switch state from on to off in the step 312, the distance dr by which the optical pickup 11 is further moved in the outer radial direction, is set to 1.0 mm. Provided that a maximum tolerance on an actual position of the optical pickup 11 from a radius of 23.49 mm when the limit switch 24 is changed into the off state is indicated by ±a mm, and that a maximum tolerance on the distance dr when the optical pickup 11 moves the distance dr in the outer radial direction in the step 312 is indicated by ±b mm, the automatic adjustment position A of interest will be positioned on a circle having a radius of 24.49 (±|a+b|) mm on the optical disc 5.

In this embodiment, the tolerance |a+b| is set less than 0.31 mm. Thus, the automatic adjustment position A of interest is located in a vicinity beyond the outer periphery of the lead-in area in the above-mentioned DVD-ROM or DVD-RW and is included in the lead-in area of the CD. This automatic adjustment position A of interest is not included in the BCA area of the DVD-ROM or in the NBCA area of the DVD-RW.

Accordingly, in the above-mentioned DVD-ROM and DVD-RW, the position of interest is not located within the BCA or the NBCA. Generally, in the DVD-ROM and the DVD-RW, which have normal signals recorded thereon in a direction proceeding from the inner periphery outwardly, the signal is assumed to be recorded at the position of interest which is located in a vicinity beyond the outer periphery of the lead-in area, whereby appropriate automatic adjustment is carried out using the signal recorded at the position of interest. Also in the CD, the lead-in area, which includes this automatic adjustment position of interest, is the first session of the lead-in area where a signal is surely recorded, even in a multiple session CD, thereby appropriately carrying out automatic adjustment using the signal recorded in this position of interest, also.

Considering a tolerance on a radius RA for the automatic adjustment position A of interest, the RA may be in a range of 24 mm to 24.8 mm (namely, 24 mm<RA<24.8 mm). In this case, the position A of interest is included within the lead-in area of the CD, but positioned in a vicinity beyond the outer peripheral area of the lead-in area within the DVD-ROM or the DVD-RW. That is, in this case, a tolerance may be set below ±0.4 mm, and a targeted position as the automatic adjustment position A of interest may be set at 24.4 mm, for example.

The tolerance on the radius RA may be set below ±0.625 mm, and a targeted position as the automatic adjustment position A of interest may be set at 24.175 mm. Thus, the radius RA for the automatic adjustment position A of interest may be in a range of 23.55 mm to 24.8 mm (namely, 23.55 mm<RA<24.8 mm). This allows the position A of interest to be located within the lead-in area of the CD and in the outer periphery of the lead-in area of the DVD-ROM or the DVD-RW, but not included in the BCA area of the DVD-ROM or the NBCA area of the DVD-RW, whereby automatic adjustment may be carried out. This construction also permits appropriate automatic adjustment to the general DVD-ROM, DVD-RW, and CD.

The tolerance on the radius RA may be set below ±0.125 mm, and a targeted position as the automatic adjustment position A of interest may be set at 23.675 mm. Thus, the radius RA for the automatic adjustment position A of interest may be in a range of 23.55 mm to 23.8 mm (namely, 23.55 mm<RA<23.8 mm). This allows the position A of interest to be located within the lead-in areas of the DVD-ROM, the DVD-RW, and the CD, but not included in the BCA area of the DVD-ROM or the NBCA area of the DVD-RW, whereby the automatic adjustment may be carried out. This construction also permits appropriate automatic adjustment to the general DVD-ROM, DVD-RW, and CD. Compare the RA for the position A of interest preferably ranging from 24 mm to 24.8 mm (namely, 24 mm<RA<24.8 mm) or from 23.55 mm to 24.8 mm (namely, 23.55 mm<RA<24.8 mm) as described above, with the above-mentioned range of 23.55 mm to 23.8 mm (namely, 23.55 mm<RA<23.8 mm), in that the former has a larger tolerance than the latter.

As can be seen from the above-mentioned description, in the present invention, a reference position for arranging the optical pickup 11 with respect to the automatic adjustment position of interest is determined by the limit switch 24, and then the optical pickup 11 is moved to the automatic adjustment position of interest from the determined reference position. This method for moving the optical pickup 11, unlike a case where the limit switch 24 is arranged so as to directly detect the movement of the optical pickup 11 to the automatic adjustment position of interest, has an advantage in that the optical pickup 11 can read signals from the lead-in area positioned in the inner peripheral area of the automatic adjustment position of interest without being interrupted by the limit switch 24.

As mentioned above, the preferred embodiments of the present invention have been explained. It should be noted that although the optical pickup 11 is moved to the automatic adjustment position of interest from the reference position determined by the limit switch 24 for arranging the optical pickup 11 with respect to the adjustment position of interest in the embodiments, the present invention is not limited thereto. The movement of the pickup may be carried out by other methods. For example, an appropriate sensor may be disposed in the apparatus such that it directly detects the movement of the optical pickup 11 to the automatic adjustment position of interest.

According to the preferred embodiments, discs such as the CD, the DVD-ROM having the BCA, and the DVD-RW having the NBCA can be subjected to the appropriate automatic adjustment.

As mentioned above, in accordance with the present invention, there is provided an optical disc reproduction apparatus for the reproduction of the DVD-ROM having a BCA or the DVD-RW having a NBCA that permits the appropriate automatic adjustment to the servo control system.

Further, in accordance with the present invention, there is provided an optical disc reproduction apparatus for reproducing a plurality of optical discs including the DVD-ROM having a BCA and/or the DVD-RW having a NBCA that permits the appropriate automatic adjustment to the servo control system.

What is claimed is:

1. An optical disc reproduction apparatus for rotating an optical disc and reading a signal recorded in said optical disc by an optical pickup to reproduce data, while carrying out servo control including at least one of focus servo control and tracking servo control, the apparatus comprising:

an automatic adjustment section for adjusting a characteristic of said servo control before the reproduction of the data, said automatic adjustment section including an optical pickup arrangement controller for moving said optical pickup to an automatic adjustment position of interest which is located away from a rotation center of the optical disc by a predetermined distance in the radial direction, and an adjustment section for adjusting the characteristic of the servo control in accordance with the signal read from the optical disc by the optical pickup at said automatic adjustment position of interest, wherein said predetermined distance is more than 23.55 mm, and wherein said optical disc is one of a Digital Video Disc Read Only Memory (DVD-ROM) and a Digital Video Disc Rewritable (DVD-RW).

2. The optical disc reproduction apparatus according to claim 1, wherein said optical disc reproduction apparatus is to load a set of a Compact Disc (CD) and the DVD-ROM, or a set of a CD and the DVD-RW, or a set of a CD, the DVD-ROM and the DVD-RW, as said optical discs, and to reproduce the data therefrom, and wherein said predetermined distance is more than 23.55 mm and less than 24.8 mm.

3. The optical disc reproduction apparatus according to claim 2, wherein said predetermined distance is more than 24.0 mm and less than 24.8 mm.

4. The optical disc reproduction apparatus according to claim 2, wherein said predetermined distance is more than 23.55 mm and less than 23.8 mm.

5. The optical disc reproduction apparatus according to claim 1, wherein said optical pickup arrangement controller comprises a limit switch for detecting movement of said pickup to a predetermined detection position, and a movement controlling section for moving said optical pickup to said automatic adjustment position of interest, said movement controlling section being operable to move said optical pickup in the radial direction of the optical disc, to cause said limit switch to detect the movement of the optical pickup to said detection position, and then to move the optical pickup to the automatic adjustment position, based on the position where the optical pickup is located when the limit switch detects the movement of the optical pickup, wherein said predetermined detection position is located away from the rotation center of the optical disc by a distance less than 23.8 mm.

6. The optical disc reproduction apparatus according to claim 5, wherein said optical disc reproduction apparatus is to load a set of a Compact Disc (CD) and the DVD-ROM, or a set of a CD and the DVD-RW, or a set of a CD, the DVD-ROM and the DVD-RW, as said optical discs, and to reproduce the data therefrom, and wherein said predetermined distance is more than 23.55 mm and less than 24.8 mm.

7. The optical disc reproduction apparatus according to claim 6, wherein said predetermined distance is more than 24.0 mm and less than 24.8 mm.

8. The optical disc reproduction apparatus according to claim 6, wherein said predetermined distance is more than 23.55 mm and less than 23.8 mm.

9. The optical disc reproduction apparatus according to claim 5, wherein said predetermined detection position is located away from the rotation center of the optical disc by a distance less than 23.45 mm.

10. An automatic adjustment method for adjusting a characteristic of servo control before reproduction of data in an optical disc reproduction apparatus, said optical disc reproduction apparatus being operable to rotate an optical disc and read a signal recorded in said optical disc by an optical pickup so as to reproduce data, while carrying out the servo control including at least one of focus servo control and tracking servo control, said method comprising:

moving said optical pickup to a predetermined automatic adjustment position of interest; and adjusting the characteristic of the servo control in accordance with the signal read from the optical disc by the optical pickup at said automatic adjustment position of interest, wherein said optical disc is one of a Digital Video Disc Read Only Memory (DVD-ROM) and a Digital Video Disc Rewritable (DVD-RW), and wherein said automatic adjustment position of interest is a position which permits reading of a signal beyond an outer peripheral area of a Burst Cutting Area (BCA) formed in the DVD-ROM or beyond an outer peripheral area of a Narrow Burst Cutting Area (NBCA) formed in the DVD-RW.

11. The automatic adjustment method in the optical disc reproduction apparatus according to claim 10, wherein said optical disc reproduction apparatus is to load a set of a Compact Disc (CD) and the DVD-ROM, or a set of a CD and the DVD-RW, or a set of a CD, the DVD-ROM and the DVD-RW, as said optical discs, and to reproduce the data therefrom, and wherein said automatic adjustment position of interest is a position which permits reading of a signal from a lead-in area of the loaded CD, and which permits reading of the signal beyond the outer peripheral area of the BCA formed in the DVD-ROM or beyond the outer peripheral area of the NBCA formed in the DVD-RW.

12. The automatic adjustment method in the optical disc reproduction apparatus according to claim 10, wherein said automatic adjustment position of interest is a position which permits reading of the signal from one of beyond the outer peripheral area of the BCA formed in the DVD-ROM and beyond the outer peripheral area of the NBCA formed in the DVD-RW, and also from one of a lead-in area of the DVD-ROM and a lead-in area of the DVD-RW.

13. An automatic adjustment method for adjusting a characteristic of servo control before reproduction of data in an optical disc reproduction apparatus, said optical disc reproduction apparatus being operable to rotate an optical disc and read a signal recorded in said optical disc by an optical pickup so as to reproduce data, while carrying out the servo control including at least one of focus servo control and tracking servo control, said method comprising:

moving said optical pickup in a radial direction of the optical disc to cause a limit switch for detection of movement of said optical pickup to a predetermined detection position to detect the movement of the optical pickup to said detection position;

moving said optical pickup to an automatic adjustment position away from a rotation center of the optical disc by a predetermined distance in the radial direction, based on the position where the optical pickup is located when said limit switch detects the movement of the optical pickup; and adjusting the characteristic of the servo control in accordance with the signal read from the optical disc by the optical pickup at said automatic adjustment position, wherein said predetermined distance is more than 23.55 mm, and wherein said optical disc is one of a Digital Video Disc Read Only Memory (DVD-ROM) and a Digital Video Disc Rewritable (DVD-RW).

14. The automatic adjustment method in the optical disc reproduction apparatus according to claim 13, wherein said optical disc reproduction apparatus is to load a set of a Compact Disc (CD) and the DVD-ROM, or a set of a CD and the DVD-RW, or a set of a CD, the DVD-ROM and the DVD-RW, as said optical discs, and to reproduce the data therefrom, and wherein said predetermined distance is more than 23.55 mm and less than 24.8 mm.

15. The automatic adjustment method in the optical disc reproduction apparatus according to claim 14, wherein said predetermined distance is more than 24.0 mm and less than 24.8 mm.

16. The automatic adjustment method in the optical disc reproduction apparatus according to claim 14, wherein said predetermined distance is more than 23.55 mm and less than 23.8 mm.

17. The automatic adjustment method in the optical disc reproduction apparatus according to claim 13, wherein said predetermined detection position is located away from the rotation center of the optical disc by a distance less than 23.8 mm.

* * * * *